(No Model.)
J. E. HALL.
TENSION DEVICE FOR ROPE TRANSMISSION.
No. 384,360. Patented June 12, 1888.
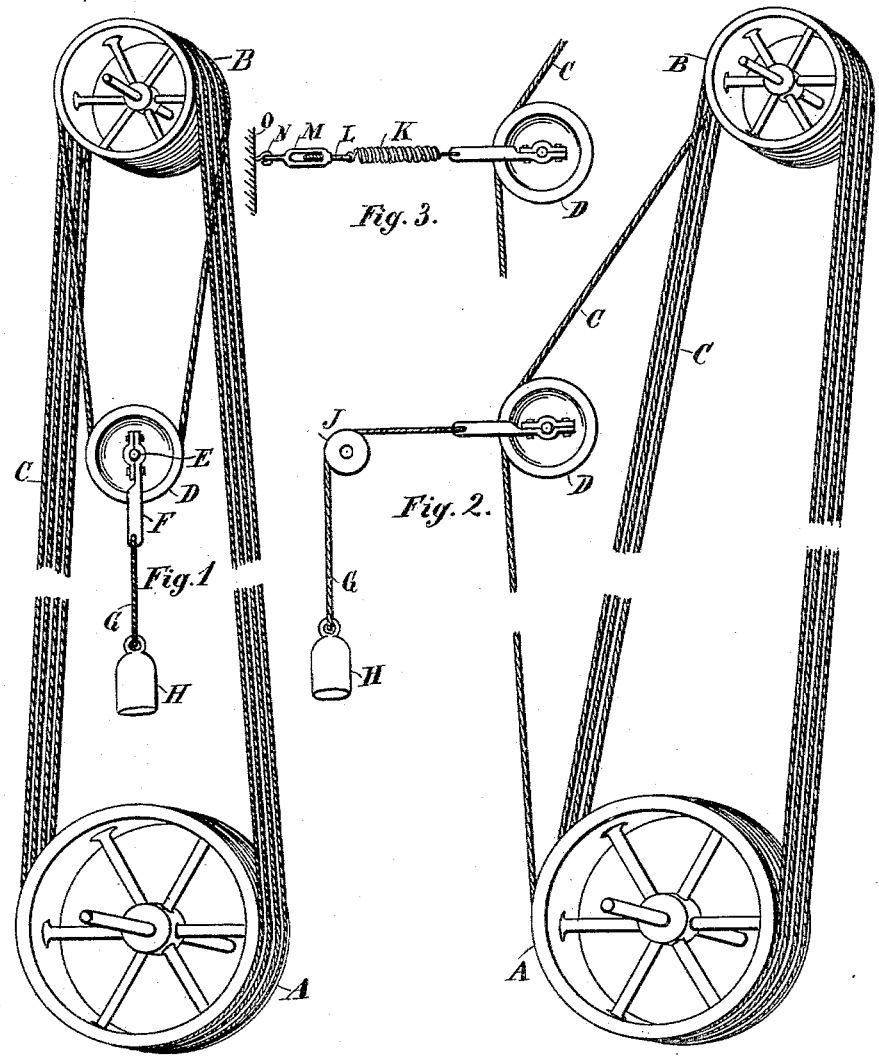
Witnesses.
Carroll J. Webster
Wesley Smith
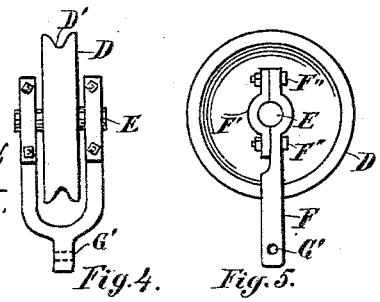
Inventor.
Jay E. Hall.
By William Webster,
Atty.

UNITED STATES PATENT OFFICE.

JAY EDWARD HALL, OF SWANTON, OHIO.

TENSION DEVICE FOR ROPE-TRANSMISSION.

SPECIFICATION forming part of Letters Patent No. 384,360, dated June 12, 1888.

Application filed August 29, 1887. Serial No. 248,174. (No model.)

*To all whom it may concern:*

Be it known that I, JAY EDWARD HALL, a citizen of the United States, and a resident of Swanton, in the county of Fulton and State of Ohio, have invented certain new and useful Improvements in a Tension Device for Rope-Transmission; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to a tension device for rope-transmission, and has for its object to provide a device that shall be inexpensive of construction, effectual in operation, and that can be attached in operative position wherever rope-transmission of power is employed. In the employment of ropes for the transmission of power from a driver to a driven pulley the tendency of the rope to vary in length, caused not only by natural stretching but by the effect of the atmosphere causing expansion or contraction of the fibers of which it is composed as the atmosphere may be dry or moist, renders it necessary that there shall be a provision made in the arrangement of the ropes, preferably intermediate the driver and driven pulleys, for taking up the slack thus caused by means that shall insure an unvarying degree of traction of the ropes upon the pulleys; and as the adhesion of the ropes to the pulleys is as to the surface contact it is necessary that a uniform tension be maintained upon the rope to urge the same into the grooves of the pulleys. It is also true of the system of rope-transmission that any device that may be employed to insure a uniform tension of the rope must be subjected to a twisting or wabbling motion, caused by the lateral sway of the portion of rope led therethrough, as well as the spiral twist of the strands that compose the rope. I accomplish these objects by the mechanism illustrated in the accompanying drawings, in which—

Figure 1 is an elevation of an arrangement of rope-transmission, showing my tension device suspended vertically. Fig. 2 is also an elevation showing the tension device suspended horizontally. Fig. 3 is a detail view of a modified construction of tension device. Figs. 4 and 5 are front and side elevations, respectively, of a pulley and hanger forming a part of my device.

Like letters of reference indicate like parts throughout the several views.

A represents the driven and B the driving pulley of a system of rope-transmission. C is the rope, which may be carried around pulleys A and B as many times as desired to secure the desired tension for the work to be done, and is then spliced to form an endless belt, the pulleys being grooved peripherally to correspond to the number of turns given the rope. In joining the ends of the rope belt that portion that pays off of the outer end of the driver is joined to the opposite end that is received upon the inner end of the driven pulley, as shown, whereby the same number of turns are maintained at all times upon the pulleys. The strand formed by splicing, as described, is led over an idler, D, grooved at D' upon its periphery and journaled upon axis E in a hanger, F, which is formed with a central bar having a perforation, G', and bifurcated to form arms between which the pulley is journaled, a semi-cylindrical bearing being formed upon the top side of each arm, with a corresponding bearing, F', matching the same being held in place by bolts F''. By this arrangement a separable bearing for journal E is formed, whereby the same can be inserted or removed, as desired. From the hanger F is suspended a weight, H, by means of a rope, G, attached at G' to hanger F.

In operation, when power is to be transmitted from a line-shaft having a pulley in vertical alignment with the driven pulley, the tension device may be suspended vertically, as shown in Fig. 1, centrally of the belts and between the two pulleys. This arrangement allows an even tension upon the rope and permits the tension device to conform to the twisting or wabbling of the rope, the weight holding the same steady. When power is to be transmitted in a lateral direction from a vertical line from the driver, the arrangement shown in Fig. 2 is employed, wherein the rope is led over a pulley, J, the weight hanging vertically therefrom. Pulley J may be mounted upon a fixed stud, a swinging pulley, or in any preferred manner. The weight, acting upon rope G and idler D, keeps the rope belt in proper tension, the portion of rope between hanger F and pulley J allowing for any lateral sway or tendency to twist.

In Fig. 3 is shown a construction wherein a spring is employed to keep the rope belt in proper tension, the spring being connected with hanger F by being passed through perforation G' and fastened in any preferred manner, the opposite end being attached to a threaded rod, L, which screws into a turn-buckle, M, attached to wall O by hanger N. The operation is the same as when a weight is employed, the spring being readily adjusted, by means of turn-buckle M and rod L, to any desired tension of idler D upon rope C, the pivoted attachment at N and flexibility of the spring allowing for lateral sway or tendency to twist in rope C.

It will be seen that my tension device is simple in construction and capable of being attached where it would be practically impossible to attach the ordinary tension device because of its great economy of space.

While I have shown and described my device as applied to a system having a main line-shaft overhead, it is equally applicable to a horizontal arrangement of pulleys, in which event the idler D is arranged in rear of either the driver or driven pulleys, the tension being arranged in a corresponding relation.

Having described my invention, what I claim, and desire to secure by Letters Patent, is—

1. The combination, with a main driver and a driven pulley, an endless rope having multiple turns around said pulleys and wrapped with one turn thereof passed at the rear face of the driver and the opposite part around the front face of the driven pulley and forming a slack strand, of a grooved idler journaled in a suspended hanger through which said slack strand is passed and held in tension by flexible attachments to the hanger, as and for the purpose set forth.

2. In combination with a driver and driven pulley, an endless rope passed back and forth around the pulleys and having a strand crossing from one face of the driver to the opposite face of the driven pulley, an idler bearing upon the separated strand, said idler journaled in a hanger, and a spring and turn-buckle secured to said hanger for holding said strand to any desired tension, as and for the purpose set forth.

In testimony that I claim the foregoing as my own I hereby affix my signature in presence of two witnesses.

JAY EDWARD HALL.

Witnesses:
WILLIAM WEBSTER,
JAMES E. RAYMER.